Sept. 25, 1945.  W. L. GRAY  2,385,570
CLOTHESLINE REEL
Filed May 13, 1944   2 Sheets-Sheet 1

Inventor
Walter Leslie Gray
By Clarence A. O'Brien
and Harvey B. Jacobson
Attorneys Sept. 25, 1945.  W. L. GRAY  2,385,570
CLOTHESLINE REEL
Filed May 13, 1944  2 Sheets-Sheet 2

Inventor
Walter Leslie Gray
By Clarence A. O'Brien
and Harvey B. Jackson
Attorneys Patented Sept. 25, 1945

2,385,570

UNITED STATES PATENT OFFICE 2,385,570

CLOTHESLINE REEL

Walter Leslie Gray, Arcadia, Wis., assignor of one-half to Frances E. Feltes, Arcadia, Wis.

Application May 13, 1944, Serial No. 535,486

2 Claims. (Cl. 242—101)

The present invention relates to new and useful improvements in reels for clotheslines and for other purposes and has for its primary object to provide a portable reel of this character by means of which the line may be reeled onto and therefrom.

An important object of the present invention is to provide a reel of this character enclosed within a casing having an opening therein through which the line extends during the reeling and unreeling action and also providing means for closing the opening to protect the line from dirt and moisture.

A still further object is to provide a device of this character of simple and practical construction, which is neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
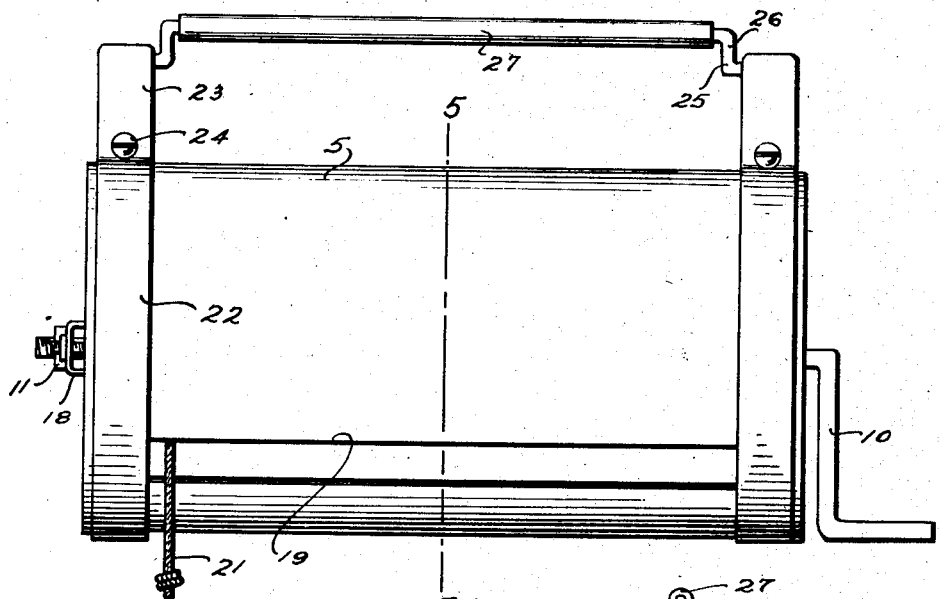
Figure 1 is a side elevational view.
Figure 2:
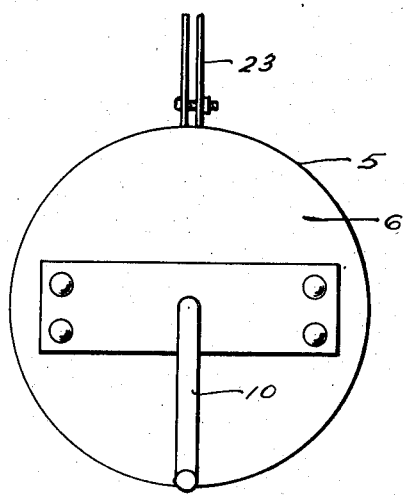
Figure 2 is an end elevational view showing the handle for the reel.
Figure 6:
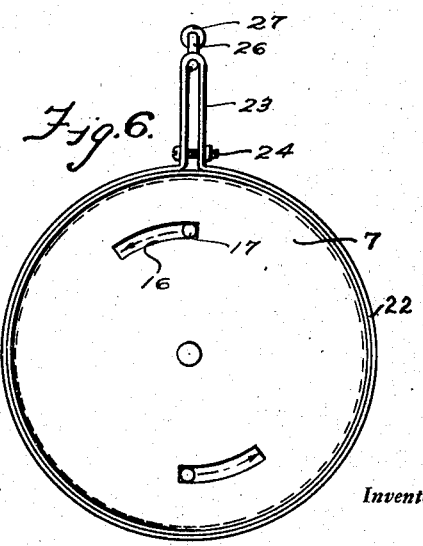
Figure 6 is an end elevational view with the inner casing operating handle removed.

Referring now to the drawings in detail wherein for the purpose of illustration I have disclosed a preferred embodiment of the invention, the numeral 5 designates an outer cylindrical casing closed at each end by the end walls 6 and 7.

A drum 8 is rotatably mounted in the casing and includes a shaft 9 journaled in the end walls 6 and 7 and having a crank handle 10 at one end thereof. The other end of the shaft 9 projects outwardly through the end wall 7 and is provided with a threaded nut 11 by means of which the shaft 9 may be removed. Flanges 12 are provided on the ends of the drum within the casing.

Figure 3:
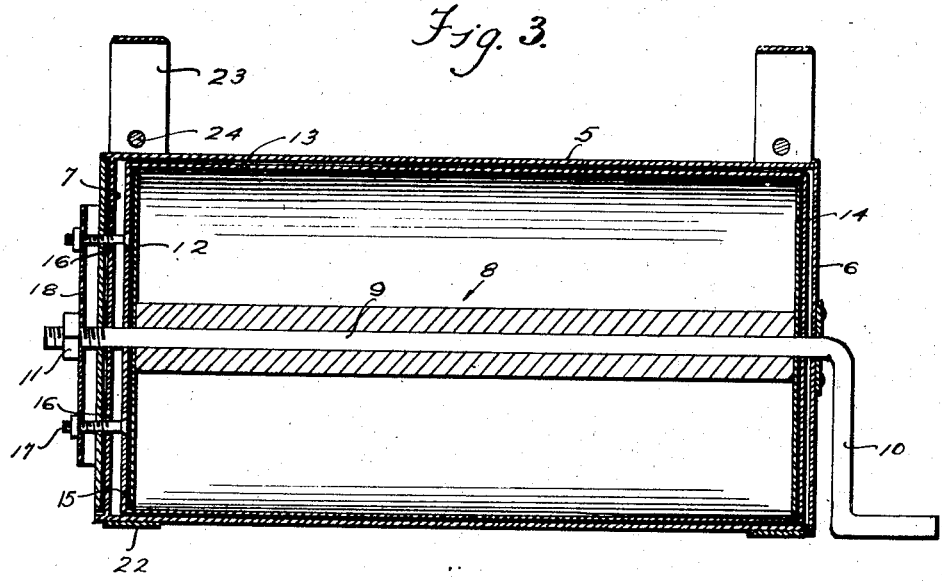
Figure 3 is a longitudinal sectional view.
Figures 4, 5:
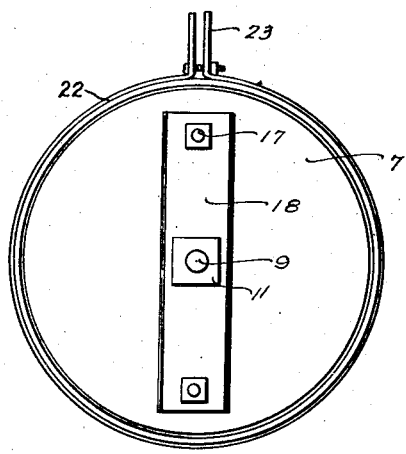
Figure 4 is an end elevational view showing the handle for operating the inner casing of the reel.
Figure 5 is a transverse sectional view taken substantially on a line 5—5 of Figure 1.

Rotatably supported on the shaft 9 within the casing 5 is an inner cylindrical casing 13 having end walls 14 and 15 positioned between the flanges 12 of the drum and the adjacent end wall of the outer casing 5 as shown to advantage in Figure 3 of the drawings.

The end wall 7 of the outer casing 5 is formed with a pair of arcuate slotted openings 16 for freely receiving bolts 17 connecting the end wall 15 of the inner casing 13 to a handle 18 positioned outwardly of the end wall 7 and rotatable about the axis of the shaft 9 whereby to permit manual rotation of the inner casing 13 relative to the outer casing 5, such rotation being limited by the bolts 17 traveling the slots 16.

The outer casing 5 is formed with a longitudinal slot 19 and the inner casing 13 is formed with a similar slot 20, the slots being in registry when the bolts 17 are positioned in one end of the slots 16 and the slot 20 being moved out of registry with respect to the slot 19 when the bolts 17 are moved into a position at the opposite end of the slots 16 by the manipulation of the handle 18.

The cord 21 is adapted to be wound on the drum 8 and extends outwardly through the slots 19 and 20 and when the inner casing 13 is rotated to move the slots 19 and 20 out of registry the casing will be closed to thus protect the cord from dirt and moisture.

Adjacent each end of the outer casing 5 is an annular band 22 having portions 23 bent in substantially parallel relation and secured by screws 24, the portions 23 forming loops or hangers for receiving the ends 25 of a wire handle 26 having a hand gripping sleeve 27 thereon. The handle 26 thus provides means for carrying the reel while the cord 21 is being wound therefrom as well as for carrying the device when the cord is not in use.

It is believed that the details of construction and manner of use of the device will be readily understood from the foregoing without further detailed explanation.

Having described the invention, what is claimed as new is:

1. A reel of the class described comprising inner and outer cylindrical casings each having a longitudinal slot adapted for registry with each other, said casings having end walls closing the same, a drum rotatably mounted in the inner casing and including a shaft journaled in said end walls, one of the end walls of the outer casing having arcuate slots therein, bolts attached to the adjacent end wall of the inner casing and extending through said arcuate slots, and a handle secured to the outer ends of said bolts and adapted to rotate the inner casing relative to the outer casing for moving said first-named slots out of registry.

2. A reel of the class described comprising inner and outer cylindrical casings each having a longitudinal slot adapted for registry with each other, said casings having end walls closing the same, a drum rotatably mounted in the inner casing and including a shaft journaled in said end walls, one of the end walls of the outer casing having arcuate slots therein, bolts attached to the adjacent end wall of the inner casing and extending through said arcuate slots, a handle secured to the outer ends of said bolts and adapted to rotate the inner casing relative to the outer casing for moving said first-named slots out of registry, and a handle attached to the outer casing.

WALTER LESLIE GRAY.